United States Patent [19]
Bailey

[11] Patent Number: 6,039,378
[45] Date of Patent: Mar. 21, 2000

[54] CARGO TRAY FOR A MOTOR VEHICLE

[75] Inventor: Gary M. Bailey, Stockbridge, Mich.

[73] Assignee: Chrysler Corporation, Auburn Hills, Mich.

[21] Appl. No.: 09/115,936

[22] Filed: Jul. 15, 1998

[51] Int. Cl.[7] .................................................. B60R 7/00
[52] U.S. Cl. ..................................... 296/37.16; 296/37.5
[58] Field of Search .............................. 296/37.15, 37.16, 296/37.8, 37.1, 37.5; 297/188.04, 188.05; 224/275

[56] References Cited

U.S. PATENT DOCUMENTS

| | | | |
|---|---|---|---|
| 1,179,445 | 4/1916 | Manning | 296/37.15 X |
| 2,767,896 | 10/1956 | Beck | 296/37.16 X |
| 3,088,771 | 5/1963 | Weigle | 296/37.15 X |
| 3,165,247 | 1/1965 | Burns | 296/37.16 X |
| 4,198,091 | 4/1980 | Appleton | 296/37.16 X |
| 4,277,097 | 7/1981 | Lalanne | 296/37.16 |
| 5,238,284 | 8/1993 | Whitaker | 296/37.16 |
| 5,570,931 | 11/1996 | Kargilis | 297/378.12 |
| 5,829,655 | 11/1998 | Salopek | 224/275 X |

FOREIGN PATENT DOCUMENTS

| | | | |
|---|---|---|---|
| 0283363 | 9/1988 | European Pat. Off. | 296/37.5 |
| 003705059 | 9/1988 | Germany | 296/37.5 |

*Primary Examiner*—Joseph D. Pape
*Attorney, Agent, or Firm*—James R. Yee

[57] ABSTRACT

A cargo tray for a motor vehicle is adapted to be carried by a seatback of an occupant seat. The cargo tray is operable in a stowed mode in which a bottom surface is positioned substantially flush against the seatback and in an operative mode in which the bottom surface provides a generally horizontal support surface upwardly spaced from a floor of the motor vehicle. In the preferred embodiment, the bottom surface of the cargo tray is pivotally attached to the seatback of the occupant seat and intended to be utilized when the seatback is articulated to a folded position. In such a use, the bottom surface cooperates with the now horizontally oriented seatback to provide an extended support surface, thereby increasing cargo capacity.

14 Claims, 3 Drawing Sheets

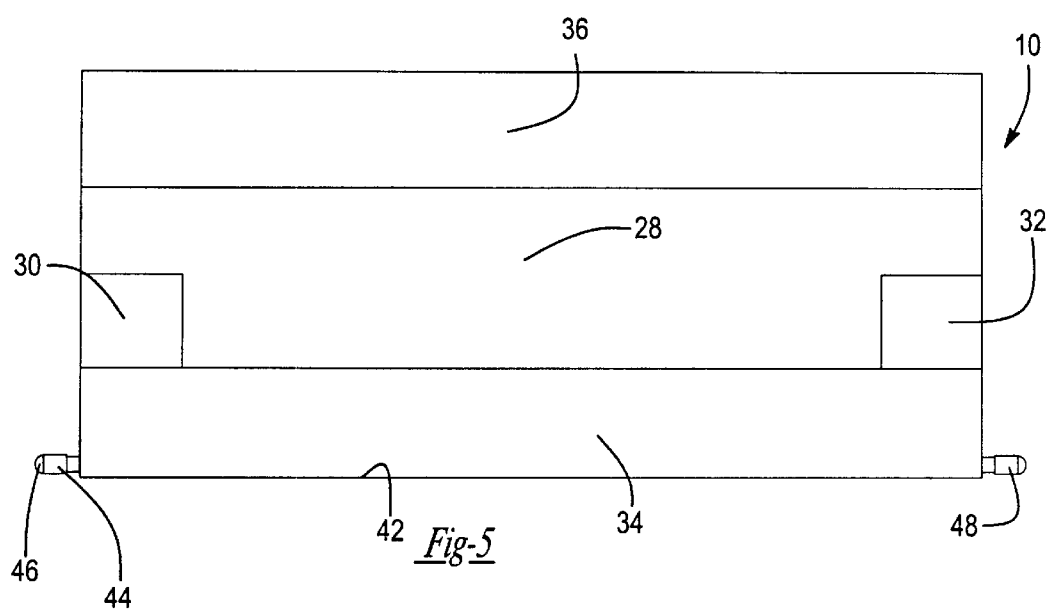

CARGO TRAY FOR A MOTOR VEHICLE

BACKGROUND OF THE INVENTION

1. Technical Field

The present invention generally relates to motor vehicles. More particularly, the present invention relates a cargo tray adapted to be pivotally mounted to a seatback for movement between a stored mode and an operative mode.

2. Discussion

Automotive vehicles, such as minivans, vans, station wagons, sport utility vehicles and the like, are often purchased for their carrying capacity. This carrying capacity includes both the transportation of passengers and the transportation of various sizes and amounts of cargo. For this reason, many of these vehicles are provided with one or more retractable seats which enable increased storage capacity when there is a limited number of passengers.

To satisfy the conflicting goals of maximizing passenger and cargo capacity, it is known to provide a motor vehicle with a removable seat assembly. For example, many current minivans are equipped with a rear bench seat that can be articulated to a folded position or removed from the vehicle in order to increase cargo capacity. While such arrangements have proven to be commercially successful, they are associated with inherent disadvantages. For example, the weight and awkwardness of the vehicle seat often require two persons for removal. Additionally, if the seat assembly is removed from the vehicle, it is not always convenient to store it. Furthermore, storage space is limited to a single tier.

In view of known prior constructions, it remains desirable to provide a cargo tray for a motor vehicle which overcomes the above-noted disadvantages.

SUMMARY OF THE INVENTION

It is a general object of the present invention to provide a selectively deployable cargo tray for a motor vehicle.

It is a more specific object of the present invention to provide a cargo tray for a motor vehicle operative in a first mode in which the cargo tray is positioned substantially flush against a seatback of an occupant seat and further operative in an operative second mode in which the cargo tray rearwardly extends from the occupant seat when the occupant's seat is folded.

In one form, the present invention provides a storage device in combination with a motor vehicle including an occupant seat and a cargo area defined by a floor and first and second spaced apart vehicle sidewalls. The occupant seat has a fold-down seatback supported for movement between an upright position and a folded position in which the seatback provides a substantially horizontal surface. The storage device includes a bottom surface. The storage device is operative in a stowed mode and an operative mode. In the stowed mode, the bottom surface is positioned substantially flush against the seatback. In the operative mode, the bottom surface cooperates with the substantially horizontal surface of the seatback to provide an elevated support surface extending rearward from the occupant seat.

In another form, the present invention provides a motor vehicle generally including a cargo area, an occupant seat and a cargo tray. The cargo area is defined by first and second spaced apart vehicle sidewalls and a floor. The occupant seat has a lower seat cushion and a seatback. The seatback is pivotally attached to the lower seat cushion for movement between a generally vertical orientation and a generally horizontal orientation. The cargo tray is carried by the seatback and includes a bottom surface. The cargo tray is operable in a stowed mode in which the bottom surface is positioned substantially flush against the seatback and in an operative mode while the seatback is in the generally horizontal orientation in which the bottom surface extends rearward of the seatback and is substantially coplanar with the seatback.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 5 is a simplified top view of the cargo tray in an intermediate mode in which the sidewalls remain folded.

DETAILED DESCRIPTION OF THE PREFERRED EMBODIMENT

Figure 1:
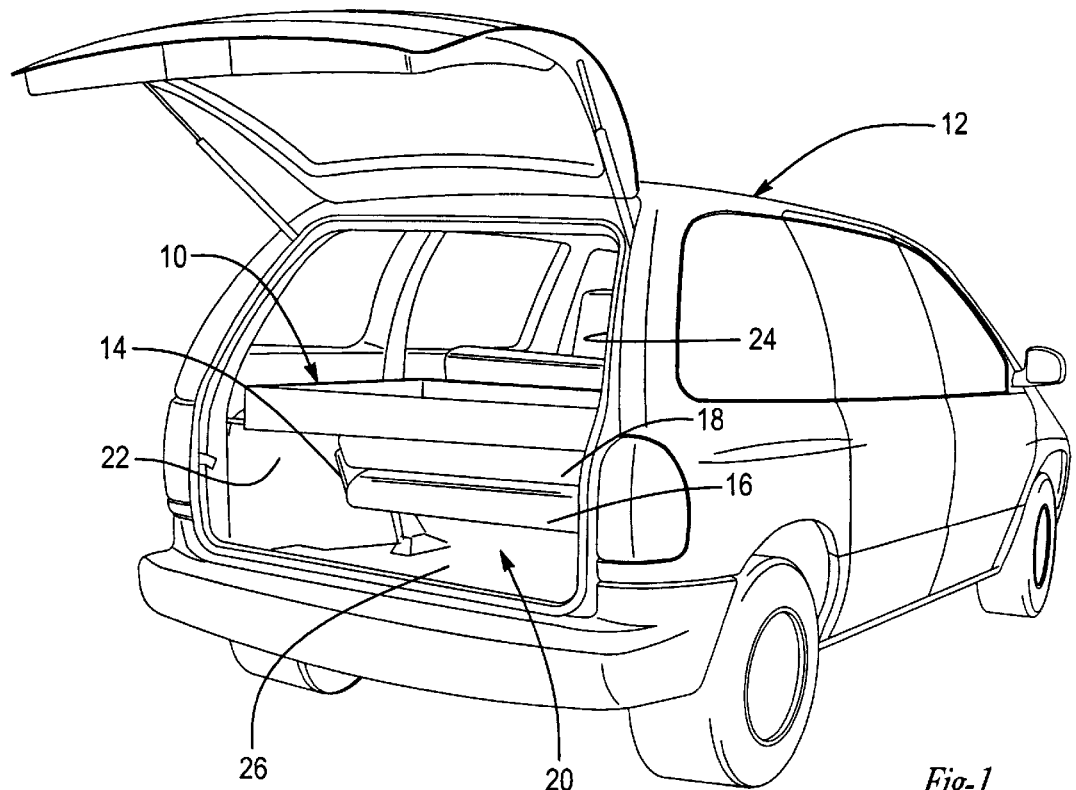
FIG. 1 is a rear perspective view of an exemplary motor vehicle incorporating a cargo tray constructed in accordance with the teachings of a preferred embodiment of the present invention, the cargo tray shown in an operative mode.

Referring initially to FIG. 1, a storage device constructed in accordance with the teachings of a preferred embodiment of the present invention is generally identified with reference numeral 10. The storage device or cargo tray 10 is shown operatively arranged with a motor vehicle 12. The motor vehicle 12 illustrated is a minivan and should be considered to be merely exemplary. In this regard, it will become apparent to those skilled in the art that the teachings of the present invention are equally applicable for various other types of vehicles, including but not limited to sport utility vehicles and the like.

Before turning to the operation and construction of the storage device 10, a brief understanding of the cooperating structure of the motor vehicle 12 is warranted. The motor vehicle 12 is illustrated to include an occupant seat 14 having a seatback 18 which is pivotably interconnected to the lower seat cushion 16. The seatback 18 can therefore be placed in an upright or substantially vertical position for passenger seating or in a folded or substantially horizontal position to facilitate the transport of cargo. As shown, the occupant seat 14 is installed in the rear seating area of the motor vehicle 12 so as to be located forward of a cargo area 20. The cargo area 20 is defined in part by first and second spaced apart vehicle sidewalls 22 and 24, and a floor 26. When the seatback 18 is shown in the folded position, providing a generally planar and horizontally oriented support surface.

With continued reference to FIG. 1 and additional reference to FIGS. 2 through 5, the storage device 10 of the present invention is illustrated to comprise a generally box-like structure having a bottom surface or support surface 28, first and second laterally spaced apart sides 30 and 32, a front side 34 and a rear side 36. The first and second laterally spaced apart sides 30 and 32, front side 34 and rear side 36 are each interconnected to the bottom surface 28 in a manner which allows them to either be folded down so that they are substantially parallel to the bottom surface 28 in order to facilitate the compact storage of the storage device 10 or folded out so that they are substantially perpendicular to the bottom surface 28 when the storage device 10 is in use.

Figure 2:
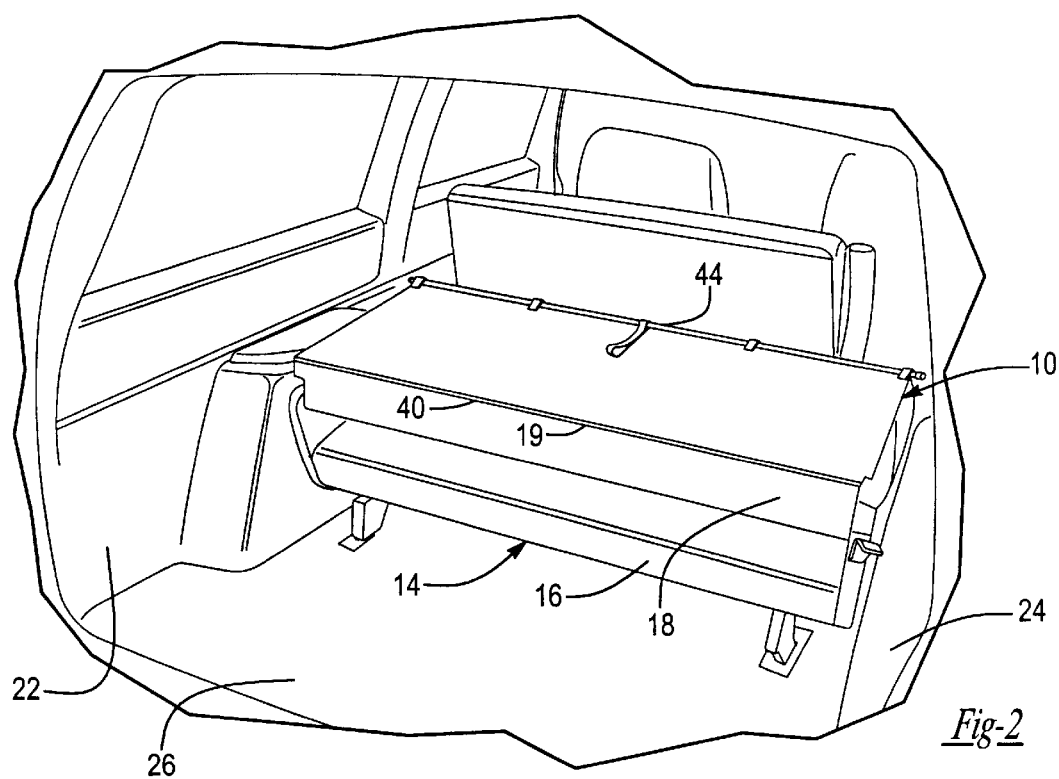
FIG. 2 is a rear perspective view of a portion of the motor vehicle of FIG. 1, illustrating the rear bench seat in a folded position and the cargo tray of the present invention in a stored mode.
Figure 3:
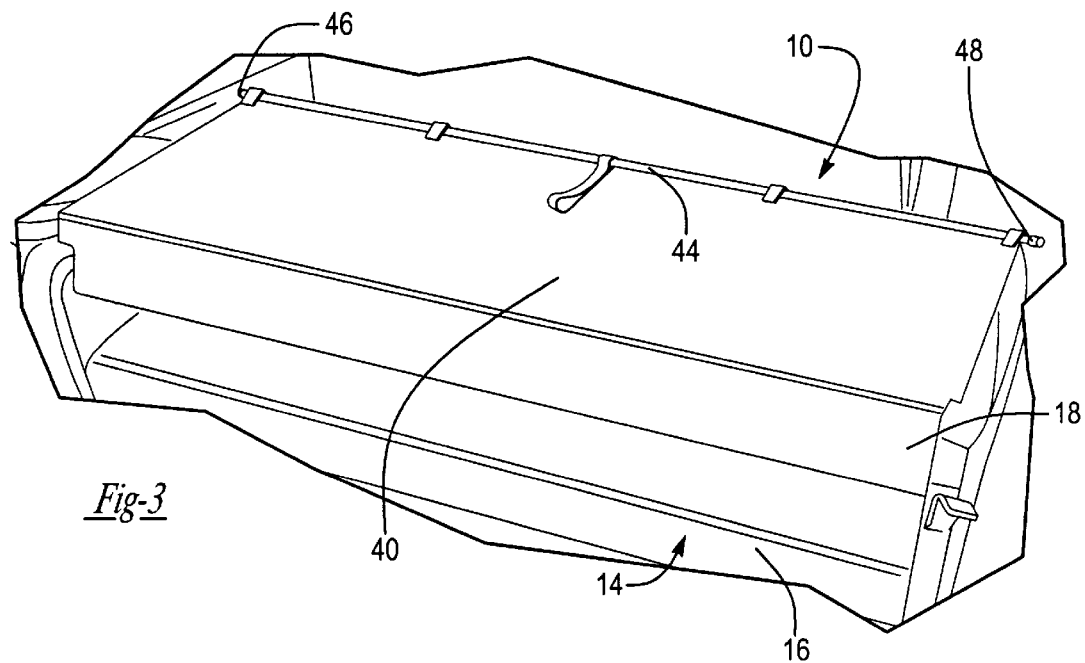
FIG. 3 is an enlarged rear view of the rear seat further illustrating the cargo tray attached thereto in a stored position.
Figure 4:
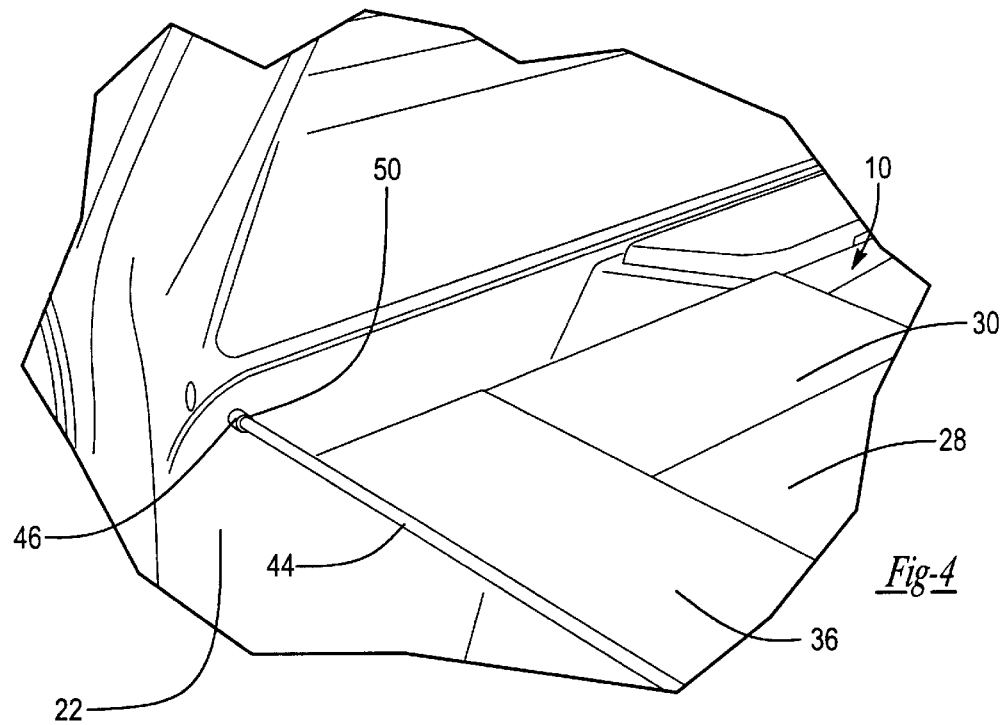
FIG. 4 is an enlarged perspective view illustrating attachment of a lateral support rod to the vehicle body.

The storage device 10 is shown to be pivotably attached along a forward edge 40 of the bottom surface 28 to a rearward edge 42 of the seatback 18. Attachment in this manner facilitates the transition between a stowed (as shown in FIG. 2) and an operative mode (as shown in FIG. 5) and provides support for the forward edge 40 when the storage device 10 is placed in the operative mode. When in the stowed mode, the bottom surface 28 is secured in a manner such that it is substantially parallel to or flush against the seatback 18. As such, storage device 10 is carried with seatback 18 when seatback 18 is repositioned to either the upright or the folded-down position.

In the embodiment shown, the storage device 10 is deployable when the seatback 18 is articulated to a folded position and extends rearwardly from the seatback 18. Support for the rear edge 42 of the storage device 10 is provided by a laterally extending support member 44. The support member 44 includes first and second ends 46 and 48 which are secured to apertures 50 provided in the first and second spaced apart vehicle sidewalls 22 and 24, as specifically shown in FIG. 4. It will be appreciated by those skilled in the art, that the rear edge 42 can alternatively be supported by a plurality of support legs (not shown).

Once the rear edge 42 is supported, the walls 30, 32, 34 and 36 are then folded up and secured in place to further define the storage device 10. In this position, the bottom surface cooperates with the substantially horizontal surface of the seatback 18 to provide an elevated support surface extending rearward from the occupant seat over the floor 26 of the cargo area 20. Returning the storage device 10 to the stowed mode entails a simple reversing of the steps detailed above. While not illustrated, it will be appreciated that a conventional latching mechanism may be employed for retaining the device 10 in its stowed position.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

What is claimed is:

1. In combination with a motor vehicle including an occupant seat and a cargo area defined by a floor and first and second spaced apart vehicle sidewalls, the occupant seat having a fold-down seatback supported for movement between an upright position and a folded position in which the seatback provides a substantially horizontal surface, the improvement comprising a storage device including a bottom surface and a plurality of storage sidewalls interconnected to said bottom surface, the bottom surface operatively attached to the occupant seat, said storage device movable to a stowed position in which said bottom surface is positioned substantially flush against the seatback and an operative position in which said bottom surface cooperates with the substantially horizontal surface of the seatback to provide an elevated support surface extending rearward from the occupant seat, each storage sidewall of said plurality of storage sidewalls foldable so as to be oriented parallel to said bottom surface when said storage device is in said stowed position and perpendicular to said bottom surface when said storage device is in said operative position.

2. The storage device of claim 1, further comprising means for supporting a rear edge of said bottom surface.

3. The storage device of claim 2, wherein said means for supporting a rear edge of said bottom surface comprises a laterally extending support member including first and second ends adapted to engage the first and second vehicle sidewalls, respectively, when said storage device is in said operative position.

4. The storage device of claim 1, wherein said bottom surface is pivotally attached to the seatback.

5. The storage device of claim 1, wherein said bottom surface includes a forward edge pivotally attached to said seatback.

6. A seating unit for a motor vehicle including a cargo area defined by first and second spaced apart vehicle walls and a floor, the seating unit comprising:

a lower seat cushion;

a seatback supported for movement between an upright position and a folded position, said seatback providing a substantially horizontal surface when in said folded position; and a cargo tray carried by said seatback, said cargo tray including a bottom surface and a plurality of sidewalls interconnected to said bottom surface, said cargo tray operable in a stowed position in which said bottom surface is positioned substantially flush against said seatback and in an operative position while said seatback is in said folded position in which said bottom surface extends rearward of said seatback and substantially coplanar with said seatback, each storage sidewall of said plurality of storage sidewalls foldable so as to be oriented parallel to said bottom surface when said storage device is in said stowed position and perpendicular to said bottom surface when said storage device is in said operative position.

7. The seating unit for a motor vehicle of claim 6, further comprising a laterally extending support member including first and second ends adapted to operatively engage the first and second vehicle sidewalls, respectively.

8. The seating unit for a motor vehicle of claim 7, wherein said first and second spaced apart vehicle sidewalls are each formed to include an aperture for receiving one of said first and second ends of said laterally extending support member.

9. The seating unit for a motor vehicle of claim 6, wherein said bottom surface is pivotally attached to a lower edge of said seatback.

10. A motor vehicle comprising:

a cargo area defined by first and second spaced apart vehicle sidewalls and a floor;

an occupant seat having a lower seat cushion and a seatback, said seatback pivotally attached to said lower seat cushion for movement between a generally vertical orientation and a generally horizontal orientation; and a cargo tray carried by said seatback, said cargo tray including a bottom surface and a plurality of sidewalls interconnected to said bottom surface, said cargo tray operable in a stowed mode in which said bottom surface is positioned substantially flush against said seatback and in an operative mode while said seatback is in said generally horizontal orientation in which said bottom surface is rearward of said seatback and substantially coplanar with said seatback, each storage sidewall of said plurality of storage sidewalls foldable so as to be oriented parallel to said bottom surface when said storage device is in said stowed position and perpendicular to said bottom surface when said storage device is in said operative position.

11. The motor vehicle of claim 10, wherein said bottom surface is positioned above said floor of said cargo area when said cargo tray is in said operative mode.

12. The motor vehicle of claim 10, further comprising a laterally extending support member including first and second ends adapted to operatively engage the first and second vehicle sidewalls, respectively.

13. The motor vehicle of claim 12, wherein said first and second spaced apart vehicle sidewalls are each formed to include an aperture for receiving one of said first and second ends of said laterally extending support member.

14. The motor vehicle of claim 10, wherein said bottom surface is pivotally attached to a lower edge of said seatback.

* * * * *